US006738774B2

(12) United States Patent
Uthe et al.

(10) Patent No.: US 6,738,774 B2
(45) Date of Patent: May 18, 2004

(54) METHOD FOR BENCHMARKING STANDARDIZED DATA ELEMENT VALUES OF AGRICULTURAL OPERATIONS THROUGH AN INTERNET ACCESSIBLE CENTRAL DATABASE AND USER INTERFACE

(75) Inventors: Daniel J. Uthe, Gilbert, IA (US); Earl W. Dotson, Cameron, MO (US)

(73) Assignee: Environmental Management Solutions, Urbandale, IA (US)

( * ) Notice: Subject to any disclaimer, the term of this patent is extended or adjusted under 35 U.S.C. 154(b) by 0 days.

(21) Appl. No.: 09/682,849

(22) Filed: Oct. 24, 2001

(65) Prior Publication Data

US 2003/0078926 A1 Apr. 24, 2003

(51) Int. Cl.[7] .............................................. G06F 17/30
(52) U.S. Cl. ................... 707/10; 707/2; 707/5
(58) Field of Search ............................ 707/2, 5, 10, 3, 707/4, 102, 104

(56) References Cited

U.S. PATENT DOCUMENTS

| | | | | |
|---|---|---|---|---|
| 5,689,418 A | * | 11/1997 | Monson | 702/2 |
| 6,002,984 A | * | 12/1999 | Aughenbaugh | 702/2 |
| 6,385,544 B1 | | 5/2002 | Mafra-Neto | 702/5 |
| 6,401,041 B1 | * | 6/2002 | Petersen | 702/5 |

* cited by examiner

Primary Examiner—Sanjiv Shah
(74) Attorney, Agent, or Firm—Larkin, Hoffman, Daly and Lindgron Ltd.; Thomas J. Oppold

(57) ABSTRACT

A method for uploading an agricultural operation's standardized data element values to a central database through an Internet accessible user interface and enabling users to benchmark the standardized data element values of one or more agricultural operations against the standardized data element values of other agricultural operations selectively retrieved from the central database by a benchmarking query defined by selectable attributes.

40 Claims, 25 Drawing Sheets

New User Registration $\smash{\overset{32}{\swarrow}}$

| | |
|---|---|
| Organization Name: | ☐ |
| User name: | ☐ |
| Address 1: | ☐ |
| Address 2: | ☐ |
| City: | ☐ |
| State: | ☐ |
| Postal Code: | ☐ |
| Telephone number: | ☐ |
| Fax number: | ☐ |
| E-mail address: | ☐ |
| Tax ID: | ☐ |

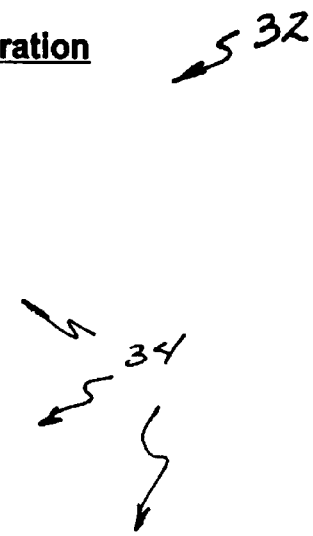

Organizational Attributes $\smash{\overset{34\text{-}1}{\swarrow}}$

| | |
|---|---|
| Part of a marketing cooperative: | Yes / No |
| Prt of a production network: | Yes / No |
| Part of a production network or vertically coordinated system: | Yes / No |

Operational Attributes

Size of organization of which this entity is a part: Nursery-Finish only
< 500 sows
500 to 5000 sows
5000 to 50000 sows
> 50000 sows.

Marketing: Pigs usually sold on some form of contract
Pigs usually sold on cash market
Other

Valuation: Market valuation
Cost valuation
Both Cost & Market valuation

Valuation of long-term assets: Market
Cost
Both Cost & Market

Type of animal produced: Commercial pig for slaughter
Purebreds for breeding purposes
Purebred crosses for breeding purposes
Program genetics for breeding purposes
Other

Genetics of animals produced: Program genetics
Purebred or purebred cross genetics
Other

Feed grain source: Majority of grain raised
Majority of grain purchased
Some grain raised, some grain purchased

Milling and mixing: Owned mill
Commercial/toll milled

Site of facilities: Breeding nurseries and finishers on same site
Breeding and nurseries on same site finishers on different site
Nurseries and finishers on same site breeding on different site
Breeding and finishers on same site nurseries on different site
Breeding nurseries and finishers all on separate sites
Multiple arrangements

FIG. 4

Production Attributes 34-3

Breed-to-Wean Operation:

Mating system used to produce pigs:     Purebred mating
Rotational crossbreeding
Rotaterminal system
Terminal crossbreeding
Other

Mating method:     Handmating
Natural ONLY
Handmating: AI ONLY
Pen Mating
Handmating: AI and Natural

Breeding location:     Single breeding location
Multiple breeding locations

Ownership of breeding facilities:     Owned
Contracted
Rented

Ownership of breeding animals:     Owned
Contracted
Rented

Ownership of labor in breeding:     Own or hired
Contracted

Average age of pigs at weaning:     < 9 days
9-13 days
14-20 days
greater than 20 days

Incoming breeding stock:     New breeding stock are rarely introduced from outside herd (closed herd)
Isolated only
Isolated and acclimated
Acclimated only
Neither isolated or acclimated

FIG. 5

Production Attributes Cont'd

Breed-to-Wean Operation Cont'd.:

Source of replacement females:  Replacement females purchased
Replacement females raised

Source of male genetics:  Semen collected at off-site boar stud
Semen collected on-site
Replacement boars purchased
Replacement boars raised
Semen Purchased & Replacement Boars Purchased
Semen purchased
Semen Collected On-site and at Off-site Boar Stud
Other

Average age of breeding/gestation facilities:  < 5 years
5-10 years
10-15 years
greater than 20 years

Breeding/gestation facility type:  Pasture
Open shelter with or without outdoor drylot
Hoop structure
Confinement: all crates
Confinement: all pens
Confinement: Mostly pens, some crates
Confinement: Mostly crates, some pens
Other

Breeding/gestation flooring material:  Wood
Metal
Concrete
Plastic
Plastic or rubber coated metal
Dirt

Breeding/gestation flooring structure:  Solid
Partially slatted
Fully slatted

FIG. 5A

Production Attributes Cont'd

Breed-to-Wean Operation Cont'd.:

Use of bedding in breeding/gestation:     Not bedded
                                                 Bedded
                                                 Deep bedded

Breeding/gestation waste handling:    Runoff/mechanical removal of solids
                                                 Pit with flush
                                                 Pit with pull plug
                                                 Pit with scraper
                                                 Gutter with flush
                                                 Gutter with mechanical removal of solids
                                                 Deep Pit Breeding/gestation ventilation: Natural automated control
                                    Natural not automated control
                                    Mechanical automated control
                                    Mechanical not automated control
                                    Combination of natural and mechanical automated control
                                    Combination of natural and mechanical not automated control

Average age of farrowing facilities:    < 5 years
                                              5-10 years
                                              10-15 years
                                              > 20 years Farrowing facility type:    Pasture
                              Hoop structure
                              Confinement

Farrowing flooring material under sows:    Wood
                                                              Metal
                                                              Concrete
                                                              Plastic
                                                              Plastic or rubber coated metal
                                                              Dirt
                                                              Some metal, some plastic

FIG. 5B

Production Attributes Cont'd

Breed-to-Wean Operation Cont'd.:

Farrowing flooring material under pigs:
Wood
Metal
Concrete
Plastic
Plastic or rubber coated metal
Dirt
Some metal, some plastic

Farrowing flooring structure:
Solid
Partially slatted
Fully slatted

Use of bedding in farrowing:
Not bedded
Bedded
Deep bedded

Farrowing waste handling:
Runoff/mechanical removal of solids
Pit with flush
Pit with pull plug
Pit with scraper
Gutter with flush
Gutter with mechanical removal of solids

Farrowing ventilation:
Natural automated control
Natural not automated control
Mechanical automated control
Mechanical not automated control
Combination of natural and mechanical automated control
Combination of natural and mechanical not automated control

Waste storage for breeding herd:
Covered pile
Uncovered pile
Deep Pit
Earthen lagoon
Steel concrete fiberglass wood or other outdoor storage structure
None

FIG. 5C

Production Attributes Cont'd

Breed-to-Wean Operation Cont'd.:

Land application of liquid waste from breeding herd:   Irrigation
Injected
Broadcast
None
Other

Land application of solid waste from breeding herd:   Spread
None
Other

FIG. 5D

Production Attributes Cont'd 34-3

Nursery Operation:

Nursery locations: Each breeding location sends pigs to a single nursery location
Each breeding location sends pigs to multiple nursery locations

Sources of pigs in nursery: Single source of pigs at each nursery location
Multiple source of pigs at each nursery location
Multiple source of pigs at each nursery location but single source of pigs in each nursery barn
Multiple source of pigs at each nursery location but single source of pigs in each nursery room

Nursery pig flow: Continuous
All-in/all-out by room
All-in/all-out by building
All-in/all-out by site

Ownership of nursery facilities: Owned
Contracted
Rented
Some owned, some contracted
Some owned, some rented

Ownership of nursery pigs: Owned
Contracted
Rented

Ownership of labor in nursery: Own or hired
Contracted
Some owned, some contracted

Average age of pigs at placement in nursery:  < 9 days
9-13 days
14-20 days
> 20 days

Number of diets fed in nursery: 1 diet (pigs are not phase fed in nursery)
2 diets
3 diets
4 diets
5 diets
> 5 diets

FIG. 6

Production Attributes Cont'd 34-3

Nursery Operation Cont'd.:

Average age of nursery facilities:     < 5 years
5-10 years
10-15 years
> 20 years

Nursery facility type:     Pasture
Open shelter with or without outdoor drylot
Hoop structure
Confinement
Other

Nursery flooring material:     Wood
Metal
Concrete
Plastic
Plastic or rubber coated metal
Dirt

Nursery flooring structure:     Solid
Partially slatted
Fully slatted

Use of bedding in nursery:     Not bedded
Bedded
Deep bedded

Average nursery pen size:     < 15 pigs per pen
15-29 pigs per pen
30-99 pigs per pen
> 100 pigs per pen

Nursery waste handling:     Runoff/mechanical removal of solids
Pit with flush
Pit with pull plug
Pit with scraper
Gutter with flush
Gutter with mechanical removal of solids
Deep pit

FIG. 6A

Production Attributes Cont'd 34-3

Nursery Operation Cont'd:

Nursery ventilation: Natural automated control
Natural not automated control
Mechanical automated control
Mechanical not automated control
Combination of natural and mechanical automated control
Combination of natural and mechanical not automated control

Waste storage for nursery: Covered pile
Uncovered pile
Deep pit
Earthen lagoon
Steel contrete fiberglass wood or other outdoor storage structure
None

Land application of liquid waste from nursery: Irrigation
Injected
Broadcast
None
Other

Land application of solid waste from nursery: Spread
None
Other

FIG. 6B

Production Attributes Cont'd

<sub>34-3</sub>

Wean-to-Finish Operation:

Nursery/finish (wean-to-finish) locations:
    Each breeding location sends pigs to a single nursery/finisher location
    Each breeding location sends pigs to multiple nursery/finisher locations

Sources of pigs in nursery/finisher (wean-to-finish):
    Single source of pigs at each nursery/finish location
    Multiple source of pigs at each nursery/finish location
    Multiple source of pigs at each nursery/finish location but single source of pigs in each nursery/finish barn
    Multiple source of pigs at each nursery/finish location but single source of pigs in each nursery/finish room

Nursery/finish (wean-to-finish) pig flow:    Continuous
                                                                         All-in/all-out by room
                                                                         All-in/all-out by building
                                                                         All-in/all-out by site

Ownership of nursery/finisher (wean-to-finish) facilities:
    All owned
    All contracted
    All rented
    Some owned, some rented
    Some owned, some rented, some contracted
    Some owned, some contracted
    Some rented, some contracted

Ownership of nursery/finisher (wean-to-finish) pigs:
    All owned
    All contracted
    All shared revenue
    Some owned, some shared revenue
    Some contracted, some shared revenue
    Some owned, some contracted

Ownership of labor in nursery/finisher (wean-to-finish):   Own or hired
                                                                                                               Contracted

Average age of pigs at placement in nursery/finisher (wean-to-finish):   < 42 days
                                                                                                                                                                 42-55 days
                                                                                                                                                                56-69 days
                                                                                                                                                                > 70 days

FIG. 7

Production Attributes Cont'd

Wean-to-Finish Operation Cont'd.:

Split sex feeding in nursery/finisher (wean-to-finish):
    Males and females are fed different diets during part or all of nursery/finisher phase
    Males and females are fed same diets throughout nursery/finisher phase

Number of diets fed in nursery/finisher (wean-to-finish):
    1 diet (pigs are not phase fed in nursery/finisher)
    2 diets
    3 diets
    4 diets
    5 diets
    > 5 diets

Average age of nursery/finisher (wean-to-finish) facilities:    < 5 years
    5-10 years
    10-15 years
    > 20 years

Nursery/finisher (wean-to-finish) facility type:    Pasture
    Open shelter with or without outdoor drylot
    Hoop structure
    Confinement
    Other

Nursery/finisher (wean-to-finish) flooring material:    Wood
    Metal
    Concrete
    Plastic
    Plastic or rubber coated metal
    Dirt

Nursery/finisher (wean-to-finish) flooring structure:    Solid
    Partially slatted
    Fully slatted

Use of bedding in nursery/finisher (wean-to-finish):    Not bedded
    Bedded
    Deep bedded

FIG. 7A

Production Attributes Cont'd 34-3

Wean-to-Finish Operation Cont'd.:

Nursery/finisher (wean-to-finish) waste handling: Runoff/mechanical removal of solids
Pit with flush
Pit with pull plug
Pit with scraper
Gutter with flush
Gutter with mechanical removal of solids

Nursery/finisher (wean-to-finish) ventilation:
Natural automated control
Natural not automated control
Mechanical automated control
Mechanical not automated control
Combination of natural and mechanical automated control
Combination of natural and mechanical not automated control

Waste storage for nursery/finisher (wean-to-finish): Covered pile
Uncovered pile
Deep pit
Earthen lagoon
Steel concrete fiberglass wood or other
    outdoor storage structure
None

Land application of liquid waste from nursery/finisher (wean-to-finish): Irrigation
Injected
Broadcast
None
Other

Land application of solid waste from nursery/finisher (wean-to-finish): Spread
None
Other

Feeding system in nursery/finisher (wean-to-finish): Tube style feeders
Wet/dry feeders
Conventional metal feeders (dry feed)
Round Feeders (Osborne style)
Other

FIG. 7B

Production Attributes Cont'd 34-3

Finishing Operation:

Finisher locations: Each nursery location sends pigs to a single finisher location
Each nursery location sends pigs to multiple finisher locations

Sources of pigs in finisher: Single source of pigs at each finisher location
Multiple source of pigs at each finisher location
Multiple source of pigs at each finisher location but single source of pigs in each finisher barn
Multiple source of pigs at each finisher location but single source of pigs in each finisher room

Finisher pig flow: Continuous
All-in/all-out by room
All-in/all-out by building
All-in/all-out by site

Ownership of finisher facilities: Owned
Contracted
Rented
Some owned, some rented
Some owned, some contracted

Ownership of finisher pigs: Owned
Contracted
Rented

Ownership of labor in finisher: Owned or hired
Contracted
Some owned, some contracted

Average age of pigs at placement in finisher: < 9 days
9-13 days
14-20 days
21-30 days
31-40 days
41-50 days
51-60 days
61-70 days
> 70 days

FIG. 8

Production Attributes Cont'd

Finishing Operation Cont'd.:

Split sex feeding in finisher:
    Males and females are fed different diets during part or all of finisher phase
    Males and females are fed same diets throughout finisher phase

Number of diets fed in finisher: 1 diet (pigs are not phase fed in finisher)
                                          2 diets
                                          3 diets
                                          4 diets
                                          5 diets
                                          > 5 diets

Ave age of finisher facilities:   < 5 years
                                            5-10 years
                                            10-15 years
                                            > 20 years

Finisher facility type:     Pasture
                                  Open shelter with or without outdoor drylot
                                  Hoop structure
                                  Confinement
                                  Other
                                  Mixture of Finisher Facility Types

Finisher flooring material:   Wood
                                        Metal
                                        Concrete
                                        Plastic
                                        Plastic or rubber coated metal
                                        Dirt

Finisher flooring structure:   Solid
                                        Partially slatted
                                        Fully slatted

Use of Bedding in finisher:   Not bedded
                                        Bedded
                                        Deep bedded

FIG. 8A

Production Attributes Cont'd

Finishing Operation Cont'd.:

Average finisher pen size:  < 15 pigs per pen
15-29 pigs per pen
30-99 pigs per pen
> 100 pigs per pen

Finisher waste handling: Runoff/mechanical removal of solids
Pit with flush
Pit with pull plug
Pit with scraper
Gutter with flush
Gutter with mechanical removal of solids
Deep Pit

Finisher ventilation:  Natural automated control
Natural not automated control
Mechanical automated control
Mechanical not automated control
Combination of natural and mechanical automated control
Combination of natural and mechanical not automated control

Waste storage for finisher: Covered pile
Uncovered pile
Deep pit
Earthen lagoon
Steel concrete fiberglass wood or other outdoor storage structure

Land application of liquid waste from finisher:  Irrigation
Injected
Broadcast
None
Other

Feeding system in finisher: Tube style feeders
Wet/dry feeders
Conventional metal feeders (dry feed)
Round Feeders (Osborne style)
Other
Floor Feeding

Land application of solid waste from finisher:  Spread
None
Other

FIG. 8B

BENCHMARK QUERY                42

Select Producer Operation to Benchmark:  [Smith Farm ▼]   44-4

Start Date: [January ▼][2000 ▼]  End Date: [February ▼][2000 ▼]    44

Required Overlap: [50% ▼]    44-7        44-6

Performance: [_____ ▼]    44-8

Percentile:
[<]  10
[>]  20    44-9
     30
     40

Compare vs. producer operations from the following states:
          44-10
| All states ▲ |           50
| Alabama      | [Add >]   60
| Alaska       | [< Remove]70
| Arizona ▼    |           80
                           90

Compare vs. producer operations having the following organizational attributes:

| Part of a marketing cooperative: | Yes |   44-1
|                                   | No  |
|                                   |     | [Add >]
| Prt of a production network:     | Yes | [< Remove]
|                                   | No  |
| Part of a production network or  |     |
| vertically coordinated system:   | Yes |
|                                   | No  |

Compare vs. producer operations having the following operational attributes:
                                              44-2
| Size of organization of which entity is a part: ▲ |
| Nursery-Finish only                                |
| < 500 sows                                         |
| 500 to 5000 sows                        | [Add >]
| 5000 to 50000 sows                      | [< Remove]
| > 50000 sows                                       |
|                                                    |
| Marketing:                                         |
| Pigs usually sold on some form of contract         |
| Pigs usually sold on cash market                   |
| Other                                    ▼         |

FIG. 10

Benchmark Query Cont'd  /42

Compare vs. producer operations having the following production attributes:

| Breed-to-Wean Operation Attributes | | Mating system used to produce pigs: |
|---|---|---|
| Mating system used to produce pigs:<br>    Purebred mating<br>    Rotational crossbreeding<br>    Rotaterminal system<br>    Terminal crossbreeding<br>    Other<br><br>Mating method:<br>    Handmating<br>    Natural ONLY<br>    Handmating: AI ONLY<br>    Pen Mating<br>    Handmating: AI and Natural | Add ><br>< Remove<br><br>44-3 | Purebred mating |

Compare vs. producer operations having the following financial attributes:

[Empty selection boxes with Add > / < Remove buttons, labeled 44-4]

FIG. 10A

Benchmark Query Cont'd  /—42

Benchmark the following production data elements:

| Adjusted Farrowing Rate | | Litters Farrowed / Mated Breeding Female / year |
|---|---|---|
| Average Arrival To Entry Interval | | |
| Average Birth Litter Weight | /—48 | Live Born Pigs / Mated Breeding Female / Year |
| Average Breeding Female Inventory | | |
| Average Days in Finisher | | Preweaning Mortality Rate |
| Average Entry To First Service Interval | | Stillborn Rate |
| Average Finisher Pig Inventory | | Total Born Pigs / Birth Litter |
| Average Gestation Length | | Weaned Pig (Lb.) Produced / Breeding Female / Year |
| Average Lactation Length | | |
| Average Mated Breeding Female Inventory | | Weaned Pigs / Birth Litter |
| Average Nonproductive Days / Breeding Female / Year | | Weaned Pigs / Mated Breeding Female / Year |
| Average Nursery Pig Inventory | Add > | |
| Average Parity Of Beginning | < Remove | Weaned Pigs / Wean Litter |
| Breeding Female Inventory | | |
| Average Parity Of Ending Breeding Female Inventory | | |
| Average Productive Days / Breeding Female / Year | | |
| Average Unmated Breeding Female Inventory | | |
| Average Weaning Age | | |
| Average Weaning to First Service Interval | | |
| Average Weaning Weight / Pig | | |
| Average Weaning Weight / Wean Litter | | |
| Beginning Breeding Female Inventory | | |
| Breeding Female Culling Rate | | |
| Breeding Female Entry Rate | | |
| Breeding Female Mortality Rate | | |
| Breeding Female Removal Rate | | |
| Ending Breeding Female Inventory | | |
| Farrowing Rate | | |

50 —[ Execute Query ]

FIG. 10B

Benchmark Report

Selected Producer Operation Name: Smith Farm
Date Range: January, 2000 through December, 2000
User name: Joe Smith
Printed Date: August 14, 2001

| Benchmark | <10 | 10 | 20 | 30 | 40 | 50 | 60 | 70 | 80 | 90 | No. Obs | Selected Operation SDE Value |
|---|---|---|---|---|---|---|---|---|---|---|---|---|
| Litters Farrowed/Mated Breeding Female/Year | | | | | | | | | | | | |
| 1.98 | 2.15 | 2.29 | 2.36 | 2.41 | 2.45 | 2.49 | 2.52 | 2.55 | 2.69 | 103 | 2.33 |
| Live Born Pigs/Birth Litter | | | | | | | | | | | | |
| 9.4 | 9.76 | 9.84 | 10 | 10.14 | 10.25 | 10.33 | 10.46 | 10.64 | 10.98 | 102 | 9.8 |
| Live Born Pigs/Mated Breeding Female/Year | | | | | | | | | | | | |
| 15.78 | 19.4 | 20.87 | 21.93 | 22.57 | 23.21 | 23.83 | 24.36 | 24.94 | 26.33 | 103 | 18.94 |
| Preweaning Mortality Rate | | | | | | | | | | | | |
| 6.43 | 8.65 | 10.14 | 10.94 | 11.64 | 12.44 | 13.07 | 14.48 | 17.13 | 23.93 | 102 | 10.7 |
| Stillborn Rate | | | | | | | | | | | | |
| 4.38 | 5.41 | 6.3 | 6.85 | 7.24 | 7.74 | 8.42 | 8.95 | 10.02 | 11.49 | 102 | 9.69 |
| Total Born Pigs/Birth Litter | | | | | | | | | | | | |
| 10.31 | 10.69 | 10.87 | 10.98 | 11.16 | 11.41 | 11.57 | 11.66 | 11.78 | 12.2 | 102 | 10.97 |
| Weaned Pig (Lb.) Produced/Breeding Female/Year | | | | | | | | | | | | |
| 1.79 | 149.2 | 193.61 | 207.93 | 217.16 | 224.39 | 235.31 | 248.03 | 258.15 | 300.58 | 102 | 209.7 |
| Weaned Pigs/Birth Litter | | | | | | | | | | | | |
| 8.06 | 8.43 | 8.64 | 8.79 | 8.98 | 9.08 | 9.17 | 9.33 | 9.5 | 9.87 | 102 | 8.98 |
| Weaned Pigs/Mated Breeding Female/Year | | | | | | | | | | | | |
| 13.51 | 17.24 | 18.32 | 19.2 | 19.87 | 20.52 | 21.02 | 21.71 | 22.3 | 23.46 | 103 | 17.37 |
| Weaned Pigs/Wean Litter | | | | | | | | | | | | |
| 8.26 | 8.53 | 8.69 | 8.81 | 8.92 | 9.03 | 9.16 | 9.27 | 9.41 | 9.82 | 102 | 8.78 |

FIG. 11

METHOD FOR BENCHMARKING STANDARDIZED DATA ELEMENT VALUES OF AGRICULTURAL OPERATIONS THROUGH AN INTERNET ACCESSIBLE CENTRAL DATABASE AND USER INTERFACE

BACKGROUND OF INVENTION

1. Field of the Invention

The present invention relates to a method of benchmarking standardized data element values of agricultural operations, and more particularly to a method that enables users to upload an agricultural operation's standardized data element values to a central database through an internet accessible user interface and to obtain benchmarking reports comparing one or more agricultural operation's standardized data element values against the standardized data element values of other agricultural operations uploaded to the central database.

2. Description of the Related Art

Computer software programs used by producers for managing various types of agricultural operations are well known in the art. These computer software management programs allow producers to input production data and/or financial data into the programs and then the programs use this data input to perform various calculations for generating production data reports and financial data reports that are used by the producer for tracking and managing the efficiency and profitability of his agricultural operation. For example, a number of commercially available management programs including Herdsman®, PigWin®, PigChamp®, PigTails™, Porks/PC Pro™, and Smart Breeder™ are used by pork producers for managing their pork production operations. While much of the production data element (PDE) values, financial data element (FDE) values, or other data element values generated by these management programs are similar, none of these programs utilize the exact same methods for calculating all the data element values that pork producers desire to manage their pork operations. This same lack of standardization is prevalent in management programs developed for producers of other agricultural commodities. Due to this lack of standardization, even if the exact same input is entered into these various commercially available management programs, the reported data element values may vary.

For example, due to the lack of standardization in terminology and calculation methods among the various commercially available pork management programs, if a pork producer desires to know, for example, the average number of pigs weaned per sow on his operation, the producer may get different results using different pork management programs. Therefore, if a pork producer desires to know how his operation's average number of pigs weaned per sow compares to that of other producers, the producer would not be able to get an accurate comparison of this PDE value unless all of the other producers were using the same management program.

It is important, not only for pork producers, but producers for all the various agricultural commodities, to know how the data element values of their operation compare to that of other producer operations for purposes of determining the efficiency and profitability of their operations. If a particular producer's PDE values or FDE values fall below the data element values of other producers, he can reevaluate his management practices and the equipment and facilities used in his operation based on the attributes of more productive, efficient and profitable producer operations. However, if the PDE or FDE values of one producer operation are different simply because each producer is using a different management program, it is virtually impossible for producers to get an accurate benchmarking comparison of the efficiency and profitability of their operation against the operations of other producers.

Thus, while each of the various commercially available management programs may serve their intended purpose, there is a need in the various agricultural commodity industries for standardized methods for calculating the data element values particular to an agricultural commodity to enable producers to make accurate benchmarking comparisons between their operations.

Overcoming the lack of standardization in the various agricultural commodity management programs, however, provides only half of the solution for allowing producers to benchmark their operation's data element values against the data element values of other producer operations. In other words, even if each of the commercially available management programs all used the same data element terminology, calculation methods and output formats, producers would still not be able to benchmark their data element values against those of other producer operations for comparison purposes without a central database into which the data element values can be uploaded and from which the producers can then select various attributes for benchmarking their operation against those of other producer operations having similar attributes.

Thus, there is also a need in the agricultural industry to allow producers to regularly upload their operation's data element values into a central database and to also allow producers or other authorized third parties to access this central database and select the attributes for generating regular benchmarking reports to facilitate comparisons of the data element values of one or more producer operations to those of other producer operations with similar attributes. Only with the use of a central database from which regular benchmarking reports can be generated will producers have access to the type of comparison information they need to achieve the ultimate goal of improving the profitability of their operation and thus the improvement and profitability of the various agricultural commodity industries as a whole.

SUMMARY OF INVENTION

Generally, the present invention is a method for producers and other authorized third parties to upload an agricultural operation's standardized data element values into a central database via the Internet through a user interface and allows the producers and authorized third party users to benchmark the standardized data element values of one or more agricultural operations against the standardized data element values of other producer operations selectively retrieved from the central database by a benchmarking query defined by selectable attributes.

More specifically, the method comprises providing a central database and an Internet accessible user interface for uploading an agricultural operation's standardized data element values to the central database. Providing selectable attributes in the user interface to enable a user to define a benchmarking query to selectively retrieve the desired uploaded data element values of other producer operations from the central database, and then displaying the selectively retrieved standardized data element values in relation to the standardized data element values of one or more producer operations selected by the user.

To the accomplishment of the above objects, features and advantages, this invention may be embodied in the form illustrated in the accompanying drawings, attention being called to the fact, however, that the drawings are illustrative only, and the changes may be made in the specific form illustrated and described within the scope of the appended claims.

BRIEF DESCRIPTION OF DRAWINGS

Various other objects, features and attendant advantages of the present invention will become fully appreciated as the same becomes better understood when considered in conjunction with the accompanying drawings, in which like reference numerals designate the same of similar features throughout the several views, and wherein:

FIGS. 3–8B illustrate a preferred embodiment of the Internet accessible user interface of the present invention for registering new users, wherein the new user is preferably required to input information into various informational fields and to select various attributes defining a producer's agricultural operation;

FIGS. 10–10B illustrate a preferred embodiment of the Internet accessible user interface of the present invention showing preferred selectable attributes for defining a benchmarking query for a pork operation;

FIG. 11 illustrates a preferred embodiment of a sample benchmarking report generated by the present invention in which standardized data element values of a pork operation are benchmarked;

DETAILED DESCRIPTION

Figure 1:
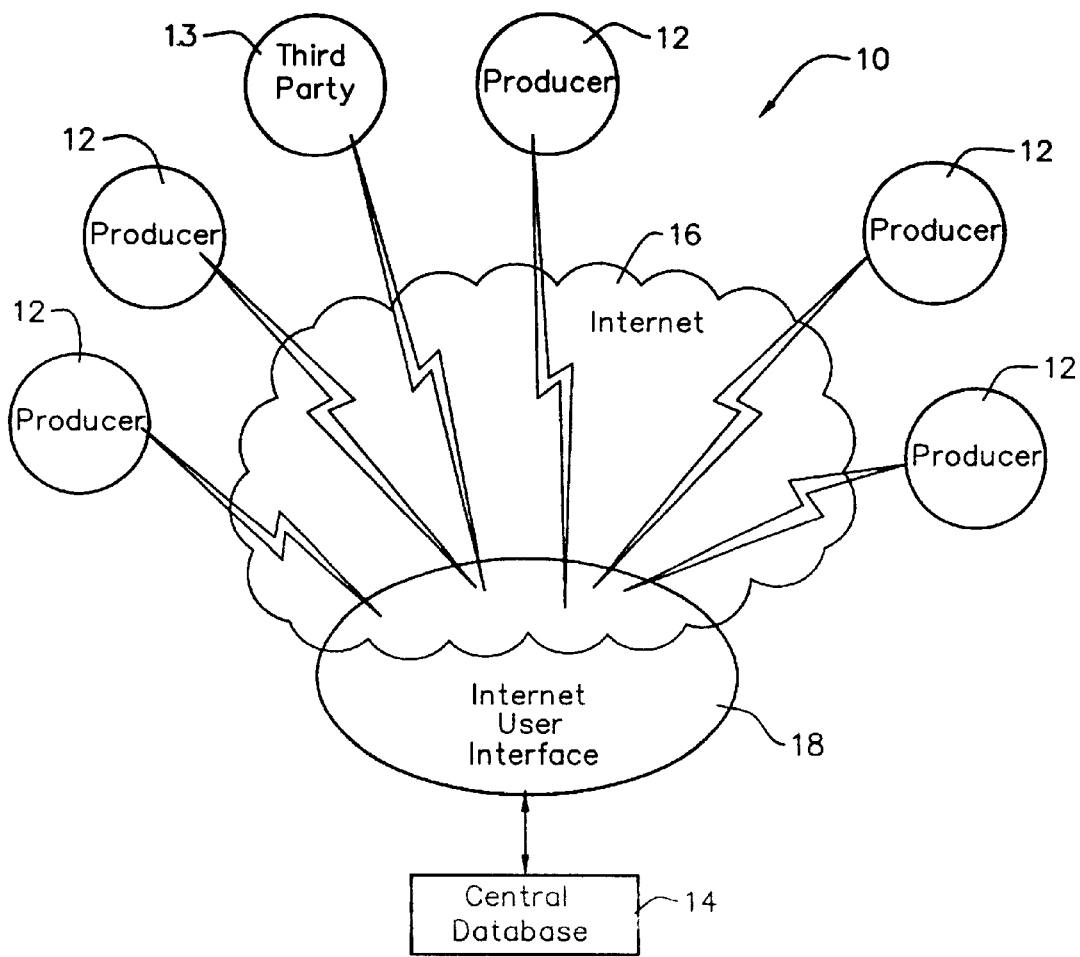
FIG. 1 schematically illustrates the present invention showing multiple users accessing a central database via the Internet through an Internet accessible user interface.

Referring descriptively to the drawings, in which similar reference numerals denote similar elements throughout the several figures, FIG. 1 illustrates, generally, an embodiment of the present invention 10 in which multiple producers 12 and third party users 13 access a central database 14 via the Internet 16 through an Internet accessible user interface 18.

Figure 2:
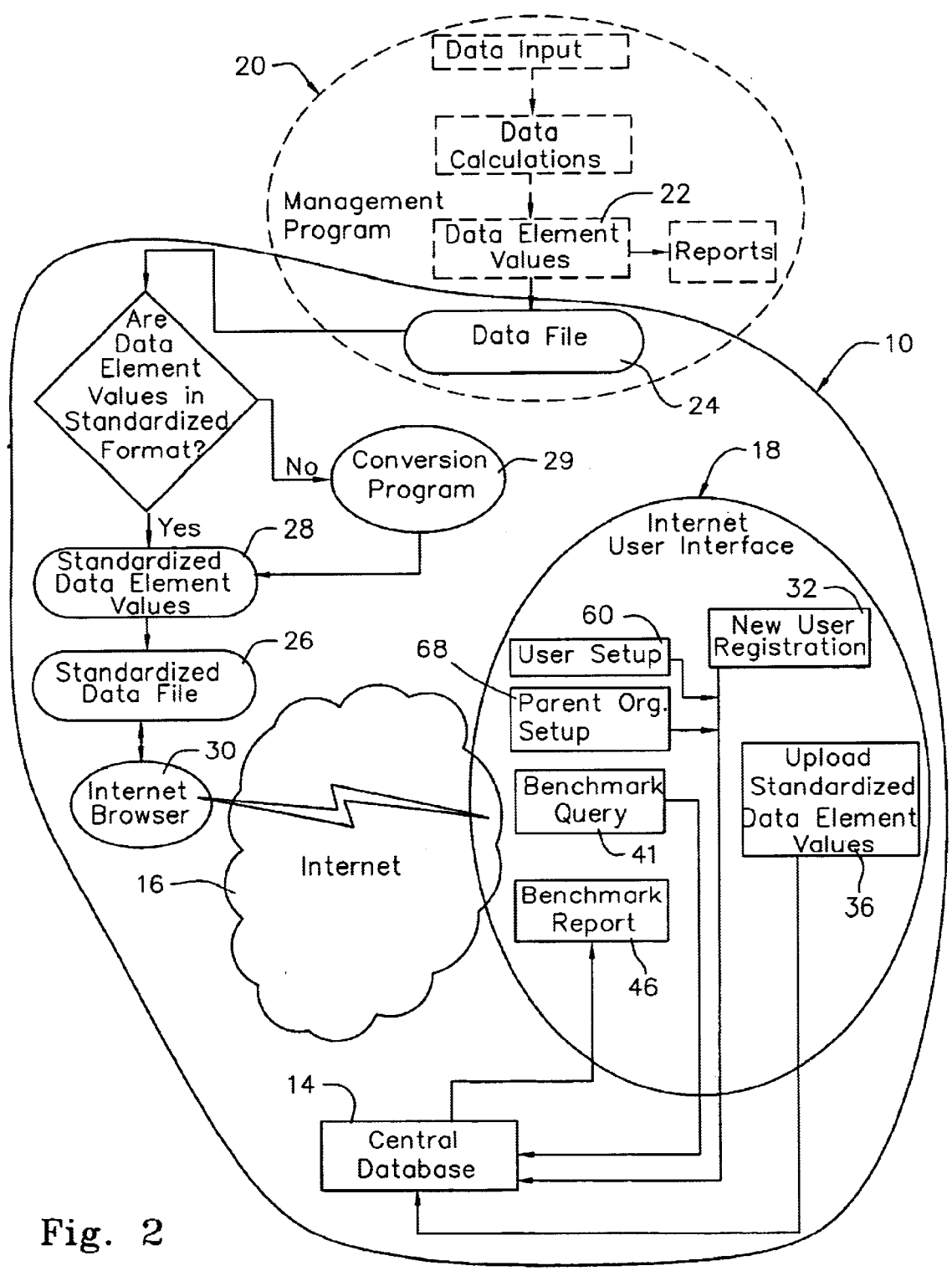
FIG. 2 schematically illustrates, in more detail, the present invention illustrated in FIG. 1.

FIG. 2 illustrates the present invention 10 in more detail, in which the present invention 10 is used in cooperation with any existing or future commercially available computer software program 20 which generates data element values 22, such as production data element (PDE) values and/or financial data element (FDE) values or any other type of data element values, used by agricultural commodity producers to track and manage their production operation.

Examples of such commercially available management programs 20 used by pork producers, include Herdsman®, PigWin®, PigChamp®, PigTails™, Porks/PC Pro™, and Smart Breeder™. Similar management programs 20 exist for other agricultural commodity production operations, including beef or dairy cattle, sheep and poultry and various crop species. It should be understood therefore, that the term "producer operation" or "operation", as used in this specification, refers to any type of agricultural operation, whether the producer is engaged in the production of livestock (such as beef or dairy cattle, pork, sheep, poultry, or any other animal or bird species), or whether the producer is engaged in the production of crops (such as corn, soybeans, wheat, barley, oats, rice, cotton, various fruits or vegetables, or any other type of plant species) or any combination of these agricultural commodities.

As graphically illustrated in FIG. 2, the present invention 10 utilizes the data file 24 containing the data element values 22 calculated by the management program 20. It should be understood, therefore, that the present invention 10 is not dependent on any particular management program 20, nor is the present invention 10 concerned with the data input into these programs 20, nor is the present invention 10 concerned with the particular terminology or calculations performed by the various types of management programs 20 in generating the data element values 22. In fact, the specific values of the data elements calculated by such programs 20 are irrelevant to the present invention 10 because the data element values 22 will vary between the different animal and crop species for which a particular management program was designed. Rather, as previously stated, the present invention 10 is only concerned with the data file 24 of the management program 20, which may contain any number of various data element values pertaining to a particular agricultural commodity arranged in any format, so long as the data element values 22 and the format in which they are uploaded to the centralized database 14 are "standardized" for the particular agricultural commodity as explained hereinafter.

Continuing to refer to FIG. 2, and for the reasons previously discussed, it is necessary that the data element values 22 generated by the management program 20 are "standardized" before uploading to the central database 10. As previously stated, however, the various management programs 20 developed for a particular agricultural commodity typically do not use the same terminology and calculation methods for generating the data element values 22. Thus, two different management programs 20, each designed for managing a pork operation, for example, may generate different PDE and/or FDE values using the same data input. To overcome this lack of standardization among the various management programs 20 for the pork industry, for example, the applicants of the present invention met with the various providers of the above-identified pork management programs 20. Through numerous meetings, standardized terminology and calculation methods were agreed upon for generating the various PDE and FDE values 22 desired by producers to track and manage their pork operations. Standardization of terminology and calculation methods for the various data element values 22 for the other agricultural commodity management programs could be achieved through similar methods. Once standardized terms and calculations methods are agreed upon for generating the desired data element values 22 for a particular agricultural commodity, the providers of the management programs 20 can modify their program code to generate "standardized" data files 26.

Thus, preferably, the management program 20 preferably directly generates a standardized data file 26 comprised of "standardized" data element values 28 arranged in a "standardized" format. The standardized data file 26 is preferably just a formatted text file containing the standardized data element values 28. It should be understood, therefore, that whenever reference is made to a "standardized data file" 26, applicants are simply referring to a data file 24 generated by any commercially available management program 20 that contains "standardized" data element values 28 based on standardized terminology and standardized calculation methods and a standardized format agreed upon by the particular agricultural commodity industry. It should be appreciated that the specific standardized data element values 28 comprising the standardized data file 26 will vary between the various agricultural commodities. Therefore, no attempt is made in this specification to define all the specific data elements for which standardized data element values 28 are calculated for the various agricultural commodities.

Alternatively, if the program providers do not wish to modify their program code to directly generate standardized data files 26, the program providers could either create their own "certified" conversion program 29, or the program providers could provide the necessary information to a third party for creating a conversion program 29 to extract the specific non-standardized data element values 22 from the program's data file 24 and apply the necessary conversion factors in order to "standardize" the data element values. With either of these methods, the various management programs 20 could be "certified" as being "standardized" or compliant for use in benchmarking comparisons with other "certified" and/or "standardized" management programs 20. Those skilled in the art would readily appreciate how to modify a program's code to modify existing calculation formulas within the programs 20 or how to create a conversion program 29 for purposes of extracting specific data element values 22 from a data file 24 and converting those data elements 22 into a standardized format based upon predefined parameters and calculation methods. Therefore further discussion with respect to the steps necessary to modify programming code of commercially available management programs 20 or the steps necessary to create a conversion program 29, is not warranted.

Once a standardized data file 26 is generated, the standardized data element values 28 are ready for uploading to the central database 14 by a user accessing the Internet user interface 18 through any existing or future Internet browser 30. It should be understood that the term "user" as used herein, refers to any individual accessing the central database 14 through the Internet accessible user interface 18. Therefore, when reference is made to a "user" it may refer to an individual producer 12, or any other third party user 13 of the present invention.

As illustrated in FIG. 2, preferably prior to uploading, or, for that matter, preferably prior to a user having any access to the central database 14, the user must first register to use the present invention through the Internet accessible user interface 18. FIG. 3 illustrates a preferred embodiment of a new user registration page 32 of the Internet accessible user interface 18 that may be accessed though the Internet browser 30. In addition to the typical registration attributes 34, such as the user's name, address, telephone number, fax number, E-mail address, tax ID, etc., as part of the registration process, the new user is preferably required to identify certain additional attributes 34 concerning the particular producer operation to be uploaded. As will be discussed in further detail later, these attributes 34 which define a producer's operation will be used by other users accessing the central database 14 to define benchmarking queries to selectively retrieve the standardized data element values of those producer operations satisfying the user's benchmarking query.

The registration page 32 of the present invention preferably includes selectable attributes 34 related to the producer operation's organizational structure. As shown in FIG. 3, these "organizational attributes" 34-1, may include selectable attributes such as for example, whether the operation is part of an input purchasing cooperative, part of a marketing cooperative, or part of a production network or vertically coordinated system.

The term "input purchasing cooperative" should be understood as including a group of producers who join together to get economies of scale or special deals when purchasing input for their operation. For livestock producers, such operation input may include feed, medicines, equipment, or buildings. For crop producers, such operation input may include seed, fertilizers, pesticides, herbicides, equipment, etc. The term "marketing cooperative" should be understood as including a group of producers who join together to market their production together to gain quantity or quality advantages when selling their products. An example of a "vertically coordinated production network" is where a slaughter facility or meat packing company contracts with various individual livestock producers such as beef, pork, sheep and poultry to supply the slaughter facility or meat packing company with slaughter animals. Similar vertically coordinated production networks can be found in the dairy industry in which individual dairy producers contract to supply milk to dairy product distributors. Likewise, vertical coordinated production networks can be found in the various crop industries, such as, for example, corn, soybeans, wheat, barley, oats, etc., where individual crop producers contract with food or feed grain distributors to supply certain quantities of the desired crop.

Another practical example of a vertically coordinated production network is when different producers join together to take advantage of another producer's facilities or expertise. For example, a pork producer having only breeding and farrowing facilities may join with a pork producer having only nursery and finishing facilities. Therefore, instead of the farrowing producer just selling his weaned pigs on the open market and the finishing producer buying his nursery or finishing pigs on the open market, the two pork producers can benefit and derive value from each other's operation.

It should be understood that additional or different "organization attributes" 34-1 may be desired for the various agricultural commodities for which the present invention may be used. Thus, the specific examples of organizational attributes 34-1 identified in FIG. 3 should not be construed as limiting the present invention in any way or to any specific type of agricultural commodity or production operation.

In addition to preferably requiring the user to identify his operation's organizational attributes 34-1, the user is also preferably required to identify general "operational attributes" 34-2 related to the type and size of the producer's operation, the producer's marketing and valuation practices, the types of animal or crop species produced, genetics of the animal or crop species produced, etc. An example of some of the preferred selectable "operational attributes" 34-2, for a pork operation, for example, are identified in FIG. 4. It should be understood that additional or different "operational attributes" 34-2 may be desired for the various agricultural commodities for which the present invention may be used. Thus, the specific examples of the operational attributes 34-2 identified in FIG. 4 should not be construed as limiting the present invention in any way or to any specific type of agricultural commodity or production operation.

The registration process of a new user also preferably requires the new user to select detailed "production attributes" 34-3 pertinent to the producer's particular type of operation to be uploaded. By way of example, FIGS. 5–8B identify specific selectable production attributes 34-3 for various types of pork production operations. Specifically, FIGS. 5–5C identify preferred selectable production attributes 34-3 for a "Breed-to-Wean" operation; FIGS. 6–6B identify preferred selectable production attributes 34-3 for a "Nursery" operation; FIGS. 7–7B identify preferred selectable production attributes 34-3 for a "Wean-to-Finish" operation; and FIGS. 8–8B identify preferred selectable production attributes 34-3 for a "Finishing" operation. As stated previously, it should be understood that additional or different "production attributes" 34-3 may be desired for the various agricultural commodities for which the present invention may be used. Thus, the specific examples of the production attributes 34-3 identified in FIGS. 5–8B should not be construed as limiting the present invention in any way or to any specific type of agricultural commodity or production operation.

In addition to organizational attributes 34-1, operational attributes 34-2, and production attributes 34-3, other attributes 34 used to define a producer operation may also be desired, such as various financial attributes, equipment attributes, etc., in essence, any identifying attribute that one may wish to associate with a producer operation.

Figure 9:
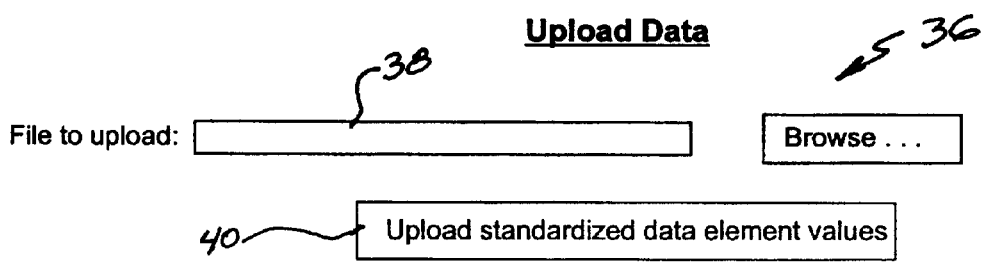
FIG. 9 illustrates a preferred embodiment of the Internet accessible user interface of the present invention for uploading the a producer operation's data element values to the central database.

As illustrated in FIG. 2, after the user is registered, the standardized data element values 28 of the producer's operation may be uploaded to the central database 14. FIG. 9 illustrates a preferred embodiment of the data upload page 36 of the Internet accessible user interface 18. Since, as mentioned above, the standardized data file 26 is preferably just a formatted text file containing standardized data element values 28, the process of uploading the standardized data element values 28 is preferably accomplished by simply copying the properly formatted standardized data file 26 stored on the user's computer system directly to the central database 14. As illustrated in FIG. 9, the preferred embodiment requests the user to enter the file name and path 38 where the standardized data file 26 resides on the user's computer or network. Once the appropriate file name and path 38 for the standardized data file 26 is entered, the user selects the upload data button 40 which then executes the appropriate commands to copy the contents of the standardized data file 26 (i.e., the properly formatted standardized data element values) to the central database 14. The uploaded standardized data element values 28 are associated in the database 14 with the producer operation's attributes 34 entered by the user during the registration process. Those skilled in the art readily appreciate that there are multiple ways to upload the contents of data files into appropriate fields of a database program and therefore further discussion of the specific steps for uploading data elements of a data file into a central database is not warranted.

Referring again to FIG. 2, after uploading the standardized data element values 28 of the producer operation, the Internet user interface 18 preferably enables the user to define a benchmarking query 41 to selectively retrieve from the central database 14 the standardized data element values 28 associated with the registered producer operations uploaded to the database 14 satisfying the user's benchmarking query 41. FIGS. 10–10B, illustrate a preferred embodiment of a benchmarking query page 42 of the Internet user interface 18. The benchmarking query page 42 of the user interface 18 enables the user to define a benchmarking query 41 by preferably selecting from a plurality of predefined attributes 44. It should be appreciated that these selectable attributes 44 by which the user defines his benchmarking query 41 correspond to many of the same selectable attributes 34 previously identified in the new user registration page 32. As with the selectable attributes 34 from the registration page 32 (see FIGS. 3–8B), the selectable attributes 44 identified in FIGS. 10–10B relate to a pork production operation and are identified for illustration purposes only. It should be understood, therefore, that additional or different "selectable attributes" 44 may be desired for the various agricultural commodities for which the present invention may be used. Thus, the specific examples of the selectable attributes 44 identified in FIGS. 10–10B should not be construed as limiting the present invention in any way or to any specific type of agricultural commodity or production operation.

The benchmarking query page 42 preferably enables the user to select the registered producer operation 44-4 for which the user wishes to obtain a benchmarking report 46 (FIGS. 2, 11). Typically, the selected registered producer operation 44-4 will be the user's own production operation, but in certain instances the user may be a third party 13 who is not the producer, but whom is an authorized user (discussed in detail later). After selecting the registered producer operation 44-4, the preferred benchmarking query page 42 preferably enables the user to select a starting date 44-5 and an ending date 44-6 for the benchmarking report 46. The selected starting and ending dates define the time period for which the standardized data element values 28 of the user's selected operation 44-4 will be benchmarked. The user is also preferably given the option to identify a required overlap 44-7 between, for example, 50% and 100% for comparison against other registered producer operations uploaded to the central database 14.

For example, an overlap of 100% for specified dates 44-5, 44-6 between January 2000 and December 2000 would retrieve registered producer operations that have standardized data element values 28 uploaded for each of the months between January 2000 and December 2000 inclusive. Producer operations that have not uploaded, for example, their December 2000 standardized data element values to the central database would be excluded from the report 46. Likewise, for example, producer operations that only have records going back to February 2000 would also be excluded from the benchmarking report 46 under this criteria. Reducing the required overlap criteria allows for the inclusion of producer operations that don't fully overlap with the selected date ranges, but which still have a full year of uploaded standardized data element values 28. For example, with a 50% required overlap for the specified dates between January 2000 and December 2000, producer operations with standardized data element values 28 uploaded for the months of July 1999 through June 2000 or for the months of July 2000 through June 2001, for example, and all combinations therebetween, would be included in the benchmarking process. Thus, reducing the required overlap, allows for a broader benchmarking comparison against the standardized data element values 28 of other registered producers that may be new users to the centralized database or who do not consistently upload their data.

In addition, the preferred embodiment also enables the user to select the performance criteria 44-8 and percentile 44-9 of the registered producer operations to be queried. The performance criteria selectable attribute 44-8 preferably includes a listing of the attributes by which a user may wish to limit his query, including organizational attributes, operational attributes, production attributes, financial attributes, etc. The percentile rank selectable attribute 44-9 preferably enables the user to selectively retrieve only those registered producer operations from the database 14 that have a value for the selected performance criteria 44-8 greater than or less than a selected percentile rank. For example, if a user selects a performance criteria 44-8 of "average breeding female inventory" and selects a percentile ranking of greater than 50% (">50%"), the query will only retrieve those registered producer operations with an average breeding female inventory having a percentile ranking 44-9 of greater than 50%. The method for calculating an operation's percentile rank is discussed in detail later. The performance criteria attribute 44-8 preferably defaults to no selected performance criteria and the percentile attribute 44-9 preferably defaults to "<10" such that all registered producer operations otherwise satisfying the selected attributes 44 defining the user's benchmarking query 41 will be selectively retrieved.

In addition, the preferred embodiment also enables the user to select a geographical attribute 44-10, preferably by state, or possibly by county, region or country, of the other producer operations to be retrieved by the query 41. Thus, if a user wishes to compare the selected operation 44-4 against only those registered producer operations that are within Iowa, for example, the user would select Iowa and add it to the search criteria. As indicated in FIG. 10, any number of states or all states may be added or removed from the user's search criteria. The geographical attribute 44-10 preferably defaults to "all states".

The preferred embodiment also preferably enables a user to define the query 41 by selecting organizational attributes 44-1, operational attributes 44-2, production attributes 44-3, financial attributes 44-4, or any other attribute 44 of a producer operation. These selectable attributes 44-1, 44-2, 44-3, 44-4, etc. correspond to the organizational, operational and production attributes, financial attributes, etc. 34-1, 34-2, 34-3, 34-4, etc. previously identified in the discussion of the preferred embodiment of the registration page 32.

Finally, the preferred embodiment of the present invention 10 enables users to select the particular data elements 48 that will be reported in the benchmarking report 46. Thus, if a user is interested in obtaining only a benchmark comparison of the average number of weaned pigs per breeding female per year for the selected operation 44-4 against other registered producer operations, then the user would only select that data element 48 to be displayed for all the registered producer operations otherwise satisfying the user's benchmarking query 41.

Once the user defines his benchmarking query 41 by selecting the desired selectable attributes 44 and the desired data elements 48 to be displayed in the report 46, the user selects the execute query button 50. The benchmarking query 41 selectively retrieves from the central database 14, the standardized data element (SDE) values 28 corresponding to the selected data elements 48 of the registered producer operations satisfying the user's benchmarking query 41. The results of the benchmarking query 41 are then displayed in the benchmarking report 46.

The sample report 46 of FIG. 11 illustrates the preferred means of displaying the results of the benchmarking query 41. The preferred report 46 preferably displays each of the selected data elements 48. Additionally, the preferred report 46 displays the SDE values 28 associated with the selected producer operation 44-4 for each of the selected data elements 48 under the column heading "Selected Operation SDE Values." Additionally, the preferred report 46 displays the number of "observations" 54, or the number of registered producer operations selectively retrieved from the central database 14 that satisfy the user's benchmarking query 41. The number of observations 54 is identified under the column heading "No. Obs." Additionally, the report 46 preferably displays, in columnar format, a percentile range 56 between "less than 10%" (i.e. "<10") through "90%" in increments often percentage points. Below each percentile range 56 is displayed the calculated average SDE value 28 for each grouping of observations 54 falling within that percentile range. The average SDE value 28 for each percentile range grouping 56 is calculated by the Internet user interface 18 by first ordering the observations 54 from the highest SDE value 28 to the lowest SDE value 28. These ordered observations 54 are then separated into groupings based upon the number of observations 54 multiplied by 10%. The average SDE value 28 for each grouping or percentile range 56 is then calculated by adding the SDE values 28 of each observation 54 within the grouping and dividing by the number of observations 54 within the grouping.

For example, in the sample benchmarking report 46 of FIG. 11, the first selected data element 48 has 103 observations 54. Therefore, each percentile range grouping 56 theoretically contains 10.3 observations 54 (i.e., 0.10×103= 10.3). Thus, the "<10" percentile grouping contains the lowest ten SDE values 28. The displayed SDE value of the "<10" percentile grouping 56 is the average of these lowest ten SDE values 28 calculated by adding them together and dividing by the number ten. The next grouping, i.e., the "10" percentile group, represents the SDE values 28 that are greater than the "<10%" percentile grouping of the observations 54, but less than the highest 80% of the observations 54. So, since 20.6 of the observations 54 (i.e., 0.20×103= 20.6) fall below the highest 80% and the lowest 10 observations 54 are already represented in the "<10" percentile grouping, the "10" percentile grouping will contain the next highest eleven observations 54 (i.e., 20.6 10=10.6≈11) having SDE values 28 that meet the criteria for the benchmarking report 46. The displayed SDE value of the "10" percentile grouping 56 is the average of these eleven SDE values 28 calculated by adding them together and dividing by eleven. The next grouping, i.e. the "20" percentile group, represents the SDE values 28 that are greater than the "10%" grouping of observations 54, but less than the highest 70% of the observations 54. Thus, since 30.9 of the observations 54 (i.e., 0.3×103=30.9) fall below the highest 70% and the lowest 21 observations 54 are already represented in the "<10" and "10" percentile groupings, the "20" percentile grouping 56 will contain the next ten observations 54 (i.e., 30.9 10 11=9.9≈10) having SDE values 28 that meet the criteria for the benchmark report 46. The displayed SDE value of the "20" percentile grouping 56 is the average of these ten SDE values 28 calculated by adding them together and dividing by ten. This same procedure is performed for each of the remaining percentile rankings 56.

Continuing to refer to FIG. 11, a sample benchmark report 46 is shown for the selected operation 44-4 of Smith Farm. The user, Joe Smith, selected a date range 44-5 starting on January, 2000 and ending date range 44-6 on December, 2000. The first selected data element 48 in the benchmarking report 46 is "Litters Farrowed/Mated Breeding Female/ Year." As shown in the sample report, Smith Farm 44-4 had an average SDE value 28 of 2.33 litters farrowed per mated breeding female per year between January, 2000 and December, 2000 as identified in the column heading "Selected Operation SDE Value". Of the 103 observations 54 satisfying Joe Smith's benchmarking query 41, Smith Farm's average value of 2.33 litters farrowed per breeding female per year 48 falls within the 20th percentile range 56 of those 103 observations 54. With this information, Joe Smith now knows that the SDE values 28 of his operation fall below those of other producers for virtually every selected data element 48 he has benchmarked. Joe Smith can then use this information to reevaluate his management practices with respect to, for example, the type of facilities he is using, the genetics of his herd, etc., in order to improve his percentile ranking 56, and thus the efficiency and profitability of his operation. Without this benchmarking report 46, Joe Smith would not have an accurate way to compare his SDE values 28 against the SDE values 28 other producers and therefore he would have no idea how efficient or profitable his operation is compared to other producers.

Figure 12:
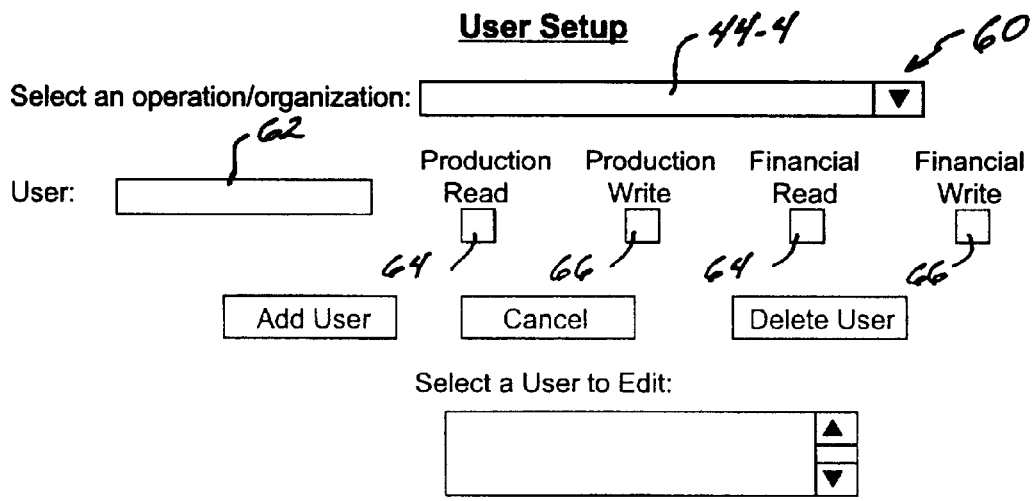
FIG. 12 illustrates a preferred embodiment of the Internet accessible user interface of the present invention in which a user can designate other authorized users for accessing the central database.

As previously discussed, there may be instances when a user/producer 12 may wish to authorize third party users 13 (FIG. 1), such as designated employees, a veterinarian, a consultant, etc., permission to access the database 14 for viewing and benchmarking the producer's SDE values 28. Thus, referring to FIG. 12, the user interface 18 preferably provides a user setup page 60 in which a user may designate other authorized users to view and/or upload and generate benchmarking reports for selected operations 44-4. As shown in FIG. 12, for a selected producer operation 44-4, a user may add other authorized users by entering their name in the authorized user box 62 and may designate the authorized user's access rights by selecting either or both the "read" box 64 or "write" box 66. Selecting the "read" box 64 grants the user the right to view or "read" the producer's SDE values 28 from the database 14. Selecting the "write" box 66 grants the user the right to upload or write to the database 14, the producer's SDE values 28. By selecting both "read" and "write" boxes 64, 66, the authorized user is granted both read and write authorization to the selected producer's SDE values uploaded to the central database 14.

Figure 13:
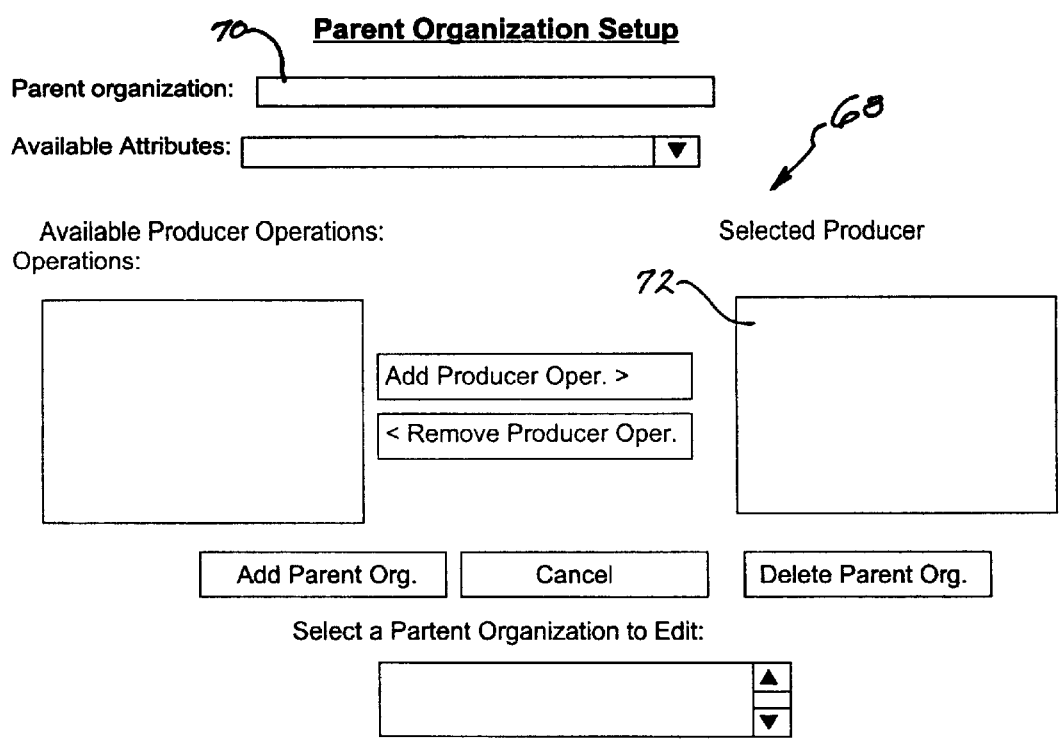
FIG. 13 illustrates a preferred embodiment of the Internet accessible user interface of the present invention in which a user can select one or more producer operations to define a parent organization.

FIG. 13 illustrates another preferred feature of the present invention 10, which includes a "Parent Organization Setup" page 68 in which the user can set up a "Parent Organization" 70 comprised of one or more producer operations. This feature is desirable for those producers who, for example, are part of a vertically coordinated production network. As illustrated in FIG. 13, through the Parent Organization Setup page 68 of the user interface 18, the user can preferably select those producer operations comprising the vertically coordinated production network, to which the user has been given at least "read" authorization as previously discussed. By setting up a "Parent Organization" 70 comprised of selected producer operations 72, the user is able to select that Parent Organization 70 as the "selected operation" 44-4 in the benchmarking query page 42 for which a benchmarking report 46 is generated. The various SDE values 28 for the selected data elements 48 of the benchmarking report 46 will be an average of the SDE values 28 of the selected producer operations 72 comprising the Parent Organization 70. In this way, for example, the user setting up the Parent Organization 70 may generate benchmarking reports 46 comparing the average SDE values 28 of that vertically coordinated production network against the SDE values 28 of other producer operations depending on the attributes 44 selected.

Similarly, a veterinarian, for example, may wish to set up a Parent Organization 70 comprised of the various selected producer operations 72 for which he is the veterinarian, assuming the veterinarian has been granted at least "read" authorization to the various selected producer operation's 72 SDE values 28 as identified above. As with the previous example, the various SDE values 28 for the selected data elements 48 in the veterinarian's benchmarking query will be the average of the SDE values 28 of the selected producer operations 72 comprising the Parent Organization 70 set up by the veterinarian. In this way, the veterinarian can benchmark the SDE values 28 of his clientele against the SDE values 28 of other producer operations to see how the average SDE values 28 of his clientele compares to other producer operations.

Based on the foregoing, it should be appreciated that with respect to each registered producer operation, all of the identifying attributes 34, including the user name, address, city, state, postal code, county, country, telephone number, fax number, E-mail address, tax-ID, etc., as well as the organizational attributes 34-1, operational attributes 34-2, production attributes 34-3, or any other desired attributes 32 (such as financial attributes, equipment attributes, etc.) entered or selected during the registration process are associated in the database 14 with that registered producer operation. Additionally, all authorized users designated in the user setup page 62 are associated with that registered producer operation. Preferably, the database 14 associates a username and password with each authorized user, which in turn is associated with that registered producer operation. Preferably the identifying attributes 34 associated with respect to a particular registered producer operation may be viewed or edited by an authorized user having "write" rights, and preferably each user has the ability to view and edit his or her own personal information entered during the registration process.

The central database 14 which is the datasource for the present invention 10, is preferably an SQL server. All calculations, with respect to identifying the number of observations 54, the percentile ranges 56, the average SDE values 28 for each percentile range 56, and the average SDE values 28 for any parent organizations 70 set up by a user, are preferably performed by the Internet user interface 18.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A method for benchmarking standardized data element values of agricultural operations, said method comprising:
    (a) providing a central database;
    (b) providing an Internet user interface for remotely accessing said central database via the Internet;
    (c) registering producer operations with said central database through said Internet user interface;
    (d) using said Internet user interface to remotely upload to said central database standardized data element values of said registered producer operations;
    (e) executing a benchmarking query to selectively retrieve from said central database, said uploaded standardized data element values of a first select one of said registered producer operations and said uploaded standardized data element values of at least one other of said registered producer operations based on select criteria;
    (f) generating a benchmarking report displaying said selectively retrieved standardized data element values of said first select one of said registered producer operations in relation to said selectively retrieved standardized data element values of said at least one other of said registered producer operations.

2. The method of claim 1 wherein said select criteria for said benchmarking query of step (e) further includes selectively choosing from a plurality of predefined data elements which of said data elements are to be selectively retrieved from said central database and displayed in said benchmarking report.

3. The method of claim 2 wherein said standardized data element values are data element values calculated by standardized calculation methods and complying with a standardized format.

4. The method of claim 3, wherein said standardized data element values are generated by a certified management program complying with said calculation methods and said standardized format.

5. The method of claim 3, wherein said standardized data element values are generated by a certified conversion program which extracts non-standardized data element values from a data file created by a non-certified management program and which converts said extracted non-standardized data element values to said standardized data element values.

6. The method of claim 3 wherein said standardized data element values include standardized production data element values.

7. The method of claim 3 wherein said standardized data element values include standardized financial data element values.

8. The method of claim 3 wherein said step (c) of registering said producer operations includes entering identifying information of a producer operation into said Internet user interface which is then remotely uploaded to said central database and associated with said producer operation.

9. The method of claim 8 wherein said identifying information includes organizational attributes of said registered producer operation.

10. The method of claim 8 wherein said identifying information includes operational attributes of said registered producer operation.

11. The method of claim 8 wherein said identifying information includes production attributes of said registered producer operation.

12. The method of claim 8 wherein said identifying information includes financial attributes of said registered producer operation.

13. The method of claim 8 wherein said identifying information includes geographical attributes of said registered producer operation.

14. The method of claim 8 wherein said step (d) of uploading said standardized data element values to said central database includes identifying a remote standardized data file, by filename and path, containing said standardized data element values and copying said remote standardized data file to said central database.

15. The method of claim 14 wherein said benchmarking query used to selectively retrieve said standardized data element values associated with a registered producer operation in said central database is defined by selectable attributes.

16. The method of claim 15 wherein said selectable attributes include organizational attributes.

17. The method of claim 15 wherein said selectable attributes include operational attributes.

18. The method of claim 15 wherein said selectable attributes include production attributes.

19. The method of claim 15 wherein said selectable attributes include financial attributes.

20. The method of claim 15 wherein said selectable attributes include geographical attributes.

21. The method of claim 15 wherein said benchmarking report includes the number of observations satisfying said benchmarking query.

22. The method of claim 21 wherein said benchmarking report includes identifying a percentile rank of said standardized data element values of said at least one other registered producer operations in relation to said retrieved standardized data element values of said observations.

23. The method of claim 22 wherein said benchmarking report further includes an average standardized data element value of percentile groupings of said observations.

24. The method of claim 1 wherein said at least one other registered producer operations includes a parent organization.

25. The method of claim 24 wherein said parent organization includes at least two of said registered producer operations.

26. A method for benchmarking standardized data element values of agricultural operations, said method comprising:

(a) for a first agricultural operation, generating data element values of said first agricultural operation using a first management program;

(b) standardizing said data element values of said first agricultural operation based upon predetermined criteria;

(c) uploading attributes relating to said first agricultural operation to a remote central database using a Internet user interface;

(d) uploading said standardized data element values of said first agricultural operation to said remote central database using said Internet user interface and associating said standardized data element values of said first agricultural operation with said uploaded attributes of said first agricultural operation;

(e) for at least one other agricultural operation, generating data element values of said at least one other agricultural operation using at least one other management program;

(f) standardizing said generated data element values of said at least one other agricultural operation based upon said predetermined criteria;

(g) uploading attributes relating to said at least one other agricultural operation to said remote central database using said Internet user interface;

(h) uploading said standardized data element values of said at least one other agricultural operation to said remote central database using said Internet user interface and associating said standardized data element values of said at least one other agricultural operation with said uploaded attributes of said at least one other agricultural operation;

(i) through said Internet user interface, executing a benchmarking query defined by select attributes corresponding to at least one of said uploaded attributes of said first agricultural operation to selectively retrieve from said remote central database any said standardized data element values of said first agricultural operation and said at least one other agricultural operation having said uploaded attributes corresponding to said select attributes;

(k) generating a benchmarking report displaying said selectively retrieved standardized data element values of said first agricultural operation in a comparative relation to said selectively retrieved data element values of said at least one other agricultural operation.

27. The method of claim 26, wherein said predetermined criteria includes predetermined calculation methods and predetermined data formats.

28. The method of claim 27 wherein said standardized data element values include standardized production data element values.

29. The method of claim 27, wherein said standardized data element values include standardized financial data element values.

30. The method of claim 27 wherein said attributes relating to said first agricultural operation and said at least one other agricultural operation include geographic attributes.

31. The method of claim 27 wherein said attributes relating to said first agricultural operation and said at least one other agricultural operation include organizational attributes.

32. The method of claim 27 wherein said attributes relating to said first agricultural operation and said at least one other agricultural operation include operational attributes.

33. The method of claim 28 wherein said select attributes include production attributes.

34. The method of claim 29 wherein said selected attributes include financial attributes.

35. The method of claim 30 wherein said select attributes include geographical attributes.

36. The method of claim 31 wherein said select attributes include organizational attributes.

37. The method of claim 32 wherein said select attributes include operational attributes.

38. The method of claim 27 wherein said benchmarking report numerically identifies the number of observations of agricultural operations satisfying said benchmarking query.

39. The method of claim 38 wherein said benchmarking report includes identifying a percentile rank of said selectively retrieved standardized data element values of said first agricultural operation in relation to said selectively retrieved standardized data element values of said observations of agricultural operations selectively retrieved by said benchmarking query.

40. The method of claim 38 wherein said benchmarking report further includes an average standardized data element value of percentile groupings of said number of observations of agricultural operations in said database selectively retrieved by said benchmarking query.

* * * * *